W. D. LAUER.
TIRE VULCANIZER.
APPLICATION FILED JULY 23, 1917.
1,271,589.
Patented July 9, 1918.
2 SHEETS—SHEET 2.
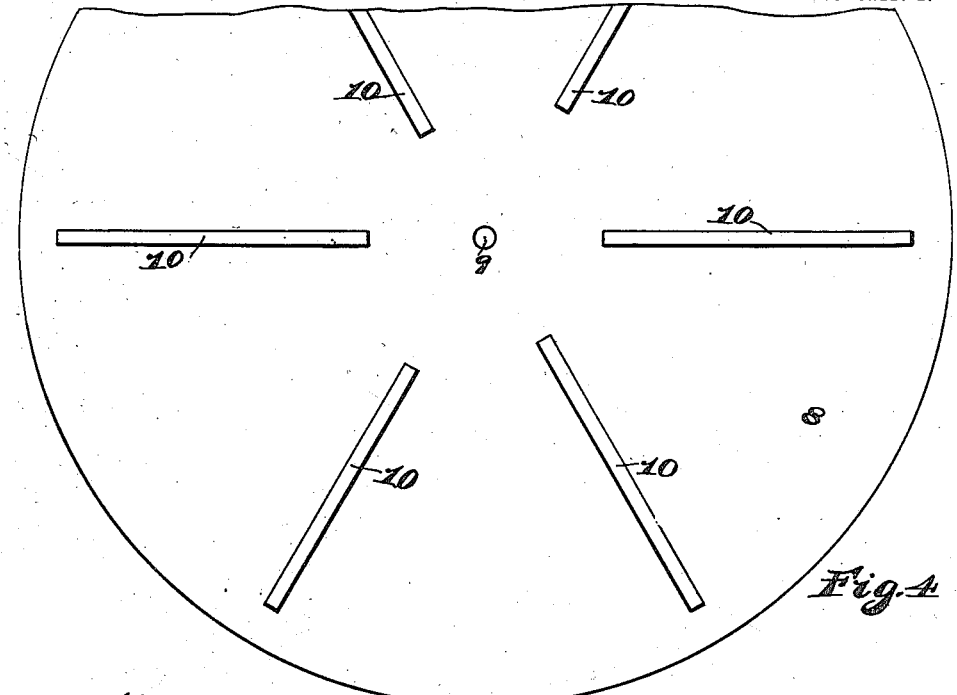
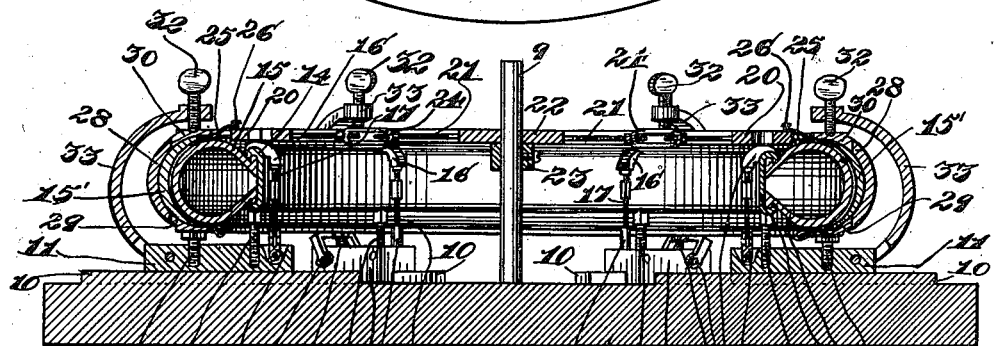
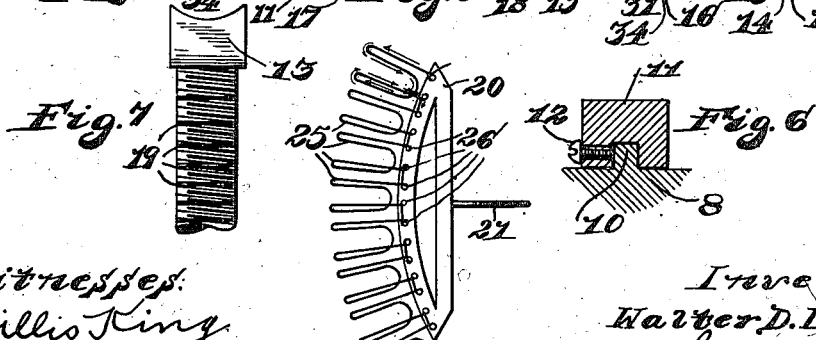
Witnesses:
Willis King
A. A. Olm
Inventor:
Walter D. Lauer
By Josiah H. Potts
his Attorney

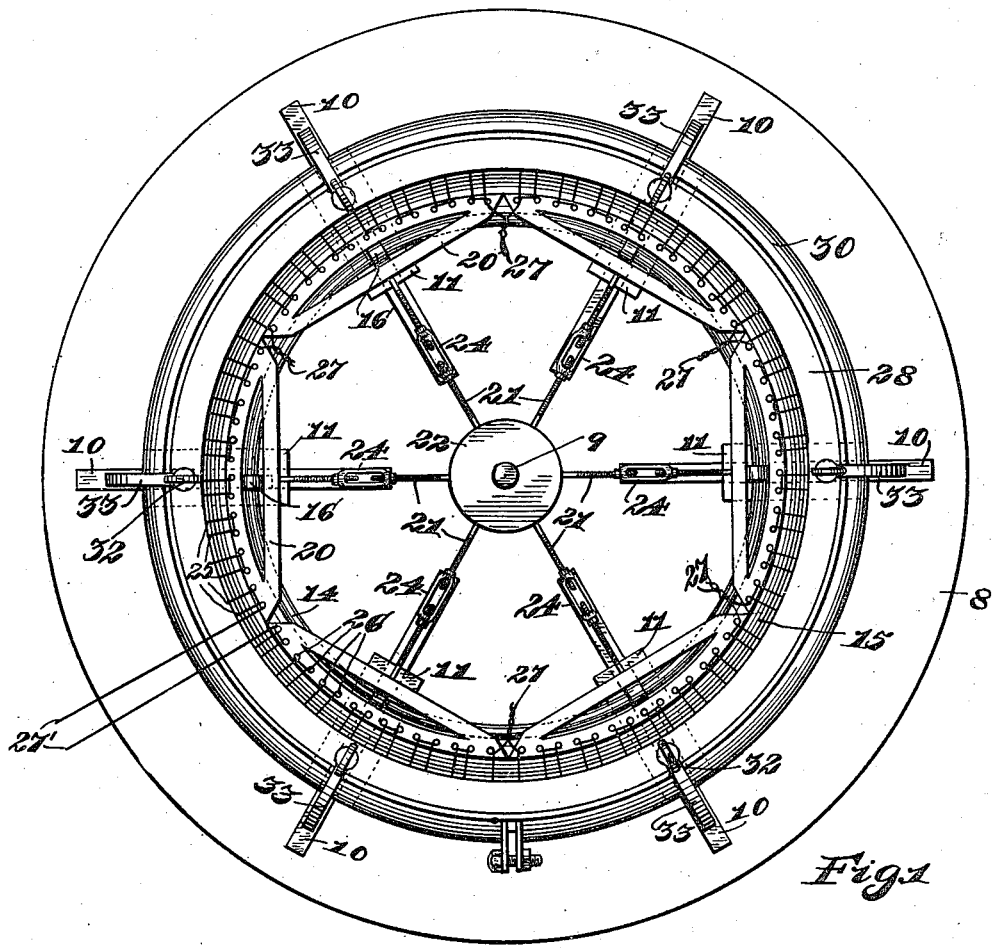

UNITED STATES PATENT OFFICE.

WALTER D. LAUER, OF CHICAGO, ILLINOIS.

TIRE-VULCANIZER.

1,271,589.  Specification of Letters Patent.  Patented July 9, 1918.

Application filed July 23, 1917. Serial No. 182,220.

*To all whom it may concern:*

Be it known that I, WALTER D. LAUER, a citizen of the United States, and a resident of the city of Chicago, county of Cook, and State of Illinois, have invented certain new and useful Improvements in Tire-Vulcanizers, of which the following is a specification.

My invention relates to improvements in tire vulcanizers designed for use especially in the retreading of pneumatic automobile tires, and has for its object the production of a device of this character through the medium of which tires of this character may be retreaded or vulcanized with ease and expedition. A further object is the production of a device as mentioned which will be of durable and economical construction and efficient in use. Other objects will appear hereinafter.

The invention consists in the combinations and arrangements of parts hereinafter described and claimed.

The invention will be best understood by reference to the accompanying drawings forming a part of this specification, and in which:

Figure 1 is a top plan view of a vulcanizing device embodying the invention, a tire being shown arranged therein, Fig. 2, a side elevation of a structure shown in Fig. 1, Fig. 3, a central section of a structure shown in Fig. 1, Fig. 4, a top plan view of the platform embodied in the invention, Fig. 5, a plan view of one of the electric heating elements included in the construction, Fig. 6, a fragmentary detail section through one of the blocks included in the construction, and Fig. 7, a side elevation of one of the screws for supporting the rim of the tire to be vulcanized.

The preferred form of construction as illustrated in the drawings comprises a circular platform 8 from which arises a central post 9. Provided upon the upper side of said platform are equally spaced radial ribs or flanges 10. Slidably mounted upon each of the ribs 10 is a block 11 adapted to be locked in positions of sliding adjustment by means of a screw 12 as seen in Fig. 6.

Threaded in and projecting upwardly from the blocks 11 are screws 13 upon the upper ends of which the rim 14 of the tire 15 to be vulcanized is adapted to rest during the employment of the device as clearly seen in Fig. 3. Coöperating with the screws 13 are clamps 16 adapted to engage with the upper edge of the tire rim, said clamps being adjustably connected by means of screws 17 to base members 18 which are pivotally connected with the blocks 11 as seen in Fig. 3. With this arrangement it will be seen that the rim of the tire to be vulcanized may be securely locked in position so as to firmly hold the tire in the vulcanizing operation. The screws 13 and clamps 16 are adapted to be adjusted to accommodate tires of various sizes, and to this end, said screws are graduated as at 19 in Fig. 7 which graduations will conform with the various sizes of tires and serve to indicate to the operator just the position to which the screws should be adjusted to accommodate the various sizes of tires.

The vulcanization is effected by means of an electric current whereby the desired heating is secured. The mechanism for effecting the vulcanization comprises a plurality of arcuate heads or sections 20 which are connected by means of threaded stems or screws 21 with a central disk or carrier 22 mounted upon post 9 and supported upon a collar 23 which is adjustably mounted upon said post as clearly seen in Fig. 3. In the stems or screws 21 are interposed turn buckles 24 through the medium of which the members 20 may be radially adjusted as will be readily understood. Carried at the outer edge of each member 20 is an electric heating element 25 formed of wire which is bent around a series of spaced posts or pins 26 provided upon the upper edge of each member 20, so as to form a series of parallel loops as clearly seen in Fig. 5. The ends of the heating elements 25 of adjacent sections are adapted to be connected together as at 27 so as to form a continuous electrical conductor, all of the members 25 being arranged in series, the current being adapted to be supplied through the outwardly projecting terminals 27', seen in Fig. 1, as will be readily understood.

The tread member 15' which it is desired to vulcanize to the tire is adapted to be held in position thereon by means of an annular split clamping band 28 which is adapted to snugly embrace the tire and be adjusted to securely hold the tread member in position thereon as will be readily understood. The longitudinal edges of the tread member are adapted to be held in close proximity with the tire by means of rings 29 and 30 provided at the under and upper sides respectively of the tire. The ring 29 is adjustably supported upon screws 31 threaded in and arising from the blocks 11, the ring 30 being held in position by means of thumb screws 32 carried by curved arms 33 which are pivotally connected with the outer ends of blocks 11 and adapted to be locked in positions of pivotal adjustment by screws 34. A plurality of rings 29 and 30 of various sizes will be provided in order to accommodate tires of various sizes or diameters. The clamping band 28, being adjustable in nature, will be adapted to be adjusted for use in connection with tires of various sizes.

In the employment of the device the tire to be vulcanized is first clamped in position by engagement of the rim thereof with the screws 13 and clamps 16. A sheet of fresh or raw rubber is then arranged over the tread of the tire. Next the electric heating elements 25, that is the loops thereof will be arranged to project transversely across the tread portion of the tire, or over the sheet of rubber arranged thereon, the tread member 15' being placed over said heating elements so that the latter will be interposed between the tire and the tread member. The loops formed in the members 25 will be of such length that the outer ends or bight portions of said loops will project beyond the edge of the tread member so as to permit of engagement thereof for a purpose hereinafter set forth. The tread member having been arranged in position, the same is clamped into secure engagement with the tire by means of the band 28 and the rings 29 and 30. Also the tire will be inflated in order to afford a backing for resisting the pressure of said band and rings.

This having been done the current is passed through the connected heating elements 25 which will cause the desired heating of the tread portion of the tire, the rubber sheet thereon, and the tread member, with the result of vulcanizing the same together. When the desired heat has been reached to insure proper vulcanization, the current will be turned off and the projecting ends or bight portions of the loops of the heating elements 25, will be severed or clipped and said elements 25 will be withdrawn or pulled out. This withdrawal or pulling out will be effected before the rubber has entirely set or hardened and is made possible through clipping or severing of the bights of the loops as will be readily understood. With this method and apparatus, it will be found that in the work produced, the tread member will be fully and securely vulcanized to the tire, the rings 29 and 30 serving to hold the edges of the tread member in proper engagement with the tire so that the same will also be completely vulcanized and not permitted to project from the sides of the tire as frequently happens in tire vulcanizing as done at the present time. Also, the heating element or wire being completely removed from the work, the same will not later give trouble, in the way of causing punctures, and loosening the fabric from the tire, such as otherwise frequently results where the heating element is not removed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The method of vulcanizing rubber comprising the interposition of an electric heating element between the rubber parts to be vulcanized together, then passing an electric current through said element, and then withdrawing said heating element after the rubber parts have been sufficiently heated, substantially as described.

2. The method of vulcanizing rubber comprising the interposition of an elongated looped heating element between the rubber parts to be vulcanized together, then passing an electric current through said heating element, then severing said loops, and then withdrawing the same after the rubber parts have been sufficiently heated, substantially as described.

3. The method of vulcanizing rubber comprising the interposition of an elongated looped heating element between the rubber parts to be vulcanized together, then passing an electric current through said heating element, then severing said loops at their bights, and then withdrawing the same after the rubber parts have been sufficiently heated, substantially as described.

4. A tire vulcanizer comprising a support for the tire to be vulcanized; means for securing the tire to said support; an electric heating element arranged above and supported by said support for coöperation with the tire, said heating element being formed in sections; and a movably mounted head carrying each of said sections, substantially as described.

5. A tire vulcanizer comprising a support for the tire to be vulcanized; means for securing the tire to said support; an electric heating element arranged above and supported by said support and adapted for insertion between the tire and tread member to be vulcanized together; and means for pressing the tread member into close engagement with the tire, substantially as described.

6. A tire vulcanizer comprising a support for the tire to be vulcanized; means for securing the tire to said support; an electric heating element arranged above and supported by said support and adapted for insertion between the tire and tread member to be vulcanized together; and means for pressing the tread member into close engagement with the tire, said means comprising a plurality of annular members adapted for adjustment toward and from the tire, substantially as described.

7. A tire vulcanizer comprising a support for the tire to be vulcanized; means for securing the tire to said support; an electric heating element arranged above and supported by said support and adapted for insertion between the tire and tread member to be vulcanized together; and means for pressing the tread member into close engagement with the tire, said means comprising a central radially adjustable annular member and a pair of vertically adjustable annular members adapted to register respectively with the center and upper and lower sides of the tire, substantially as described.

8. A tire vulcanizer comprising a support for the tire to be vulcanized; means for securing the tire to said support; an electric heating element arranged above and supported by said support and adapted for insertion between the tire and tread member to be vulcanized together; and means for pressing the center and edge portions of said tread member into close engagement with the tire, substantially as described.

9. A tire vulcanizer comprising a base; radially and vertically adjustable means on said base for supporting the tire to be vulcanized; and an electric heating element arranged above said base for coöperation with the tire, substantially as described.

10. A tire vulcanizer comprising a base; radially and vertically adjustable means on said base for supporting the tire to be vulcanized; an electric heating element arranged above said base for coöperation with the tire; and means for clampingly securing the tire to said supporting means, substantially as described.

In testimony whereof I have signed my name to this specification in the presence of two subscribing witnesses.

WALTER D. LAUER.

Witnesses:
 JOSHUA R. H. POTTS,
 B. G. RICHARDS.